(12) United States Patent
Dolfing

(10) Patent No.: US 6,349,148 B1
(45) Date of Patent: Feb. 19, 2002

(54) SIGNAL VERIFICATION DEVICE

(75) Inventor: Jannes G.A. Dolfing, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/320,624

(22) Filed: May 26, 1999

(30) Foreign Application Priority Data

May 30, 1998 (DE) .......................................... 198 24 353

(51) Int. Cl.[7] .................................................. G06K 9/00
(52) U.S. Cl. ...................................... 382/187; 704/239
(58) Field of Search ............................... 382/187, 190, 382/197, 182, 186; 704/235, 236, 237, 239, 240, 256

(56) References Cited

U.S. PATENT DOCUMENTS

| 5,231,381 A | | 7/1993 | Duwaer ....................... 340/712 |
| 5,839,103 A | * | 11/1998 | Mammone et al. .......... 704/232 |
| 5,848,388 A | * | 12/1998 | Power et al. ................ 404/239 |
| 5,995,927 A | * | 11/1999 | Li ............................... 704/246 |

OTHER PUBLICATIONS

K. Fukunaga, "Introduction To Statistical Pattern Recognition", 2ND Edition, Academic Press, New York, 1990, Chapter 10.1 and 10.2.
L.R. Rabiner And B.H. Juang: "Fundamentals Of Speech Recognition", 1ST Edition, Prentice Hall, 1993, Chapters 6.4. To 6.6.
L. Yang, B. Widjaja And R. Prasad, "Application Of Hidden Markov–Modela For Signature Verification", Pattern Recognition 28, pp. 161–170.

* cited by examiner

Primary Examiner—Andre W. Johns
Assistant Examiner—Seyed Azarian
(74) Attorney, Agent, or Firm—Daniel J. Piotrowski

(57) ABSTRACT

The invention relates to a device for the verification of time-dependent, user-specific signals which includes means for generating a set of feature vectors which serve to provide an approximative description of an input signal and are associated with selectable sampling intervals of the signal;

means for preparing an HMM model for the signal;

means for determining a first probability value which describes the probability of occurrence of the set of feature vectors, given the HMM model, and a threshold decider for comparing the first probability value with a threshold value and for deciding on the verification of the signal. In order to achieve an improved threshold value determination with an improved error rate for the verification without using additional original signals from a user whereby the device is initialized for this user, it is proposed to make the threshold value dependent on an automatically determined, person-dependent second probability value which is formed by training signals used for training the HMM model and by at least one additional validation signal which is not used for the training.

7 Claims, 3 Drawing Sheets

SIGNAL VERIFICATION DEVICE

BACKGROUND OF THE INVENTION

The invention relates to a device for the verification of time-dependent, user-specific signals which includes means for generating a set of feature vectors which serve to provide an approximative description of an input signal and are associated with selectable sampling intervals of the signal;

means for preparing a hidden Markov model (HMM) for the signal;

means for determining a first probability value which describes the probability of occurrence of the set of feature vectors, given the HMM, and a threshold decider for comparing the first probability value with a threshold value and for deciding on the verification of the signal.

For the verification of time-dependent, user-specific signals, notably signatures or speech signals, it is checked whether an input signal indeed originates from a specific user or is a forgery. In this context the term "time dependency" is to be understood to mean that the signals are venerated by the user in a giver time interval, specific, different signal components being associated wit different instants within the time interval. Before verification can take place a signal model must be formed by means of one or more original signals; for this purpose use is made of so-called hidden Markov models (HMMs). The original signals used for forming the model are training signals for the so-called training of the HMM model. After completion of training, a signal can be verified by means of the device. To this end, a user identification, for example a user name or a number assigned to the user, is entered on the one hand and the user-specific signal on the other hand. The input signal is transformed into a set of feature vector. In order to form the vector components in the case of signatures, for example co-ordinates passed during the writing of the signature are evaluated and also the pressure exerted by an input stylus. Subsequently, there is formed a probability value which describes the probability of occurrence of the set of feature vectors for the HMM model assigned to the user with the user identification. The input signal is recognized as an original signal up to a selectable threshold value and beyond that as a forgery.

In devices of this kind, however, a problem is encountered in that an effective improvement of the threshold determination, and hence an effective improvement of the error rate, by increasing the number of original signals used for the training necessitates a disproportionally large number of additional original signals which often are not available prior to the putting into operation of the device.

SUMMARY OF THE INVENTION

Therefore, it is an object of the invention to improve the device of the kind set forth in such a manner that an improved threshold value determination and an enhanced error rate are achieved without using additional original signals for the verification.

This object is achieved in that the threshold value is dependent on an automatically determined, person-dependent second probability value which is formed by means of training signals used for training the HMM model and at least one additional validation signal which is not used for the training.

The subdivision of the group of original signals available prior to the putting into operation of the device into signals which are used exclusively for the training of the HMM model and at least one signal which is not used for the training of the HMM model but exclusively as a validation signal for improving the threshold value offers au effectively enhanced error rate for the verification by means of the device. The device automatically determines a person-dependent second probability value for each user separately, the person-dependent threshold value to be determined being dependent on said second probability value. Preferably, the second probability value is formed by forming an average value, notably the arithmetical mean value, of the first probability values which are formed upon input of the validation signals after the training of the HMM model. Thus, an average value of validation signal probability values is formed.

The threshold value is formed notably by the sum of the person-dependent second probability value and a user-independent constant, so that the error rate can be further improved. Generally speaking, the term probability value is to be understood to describe a value which is derived from a probability, notably the original value of the probability, or a logarithmic value of the probability.

The invention is preferably used for on-line verification, but is also suitable for off-line verification. The user-specific signals are, for example, signatures or speech signals.

Embodiments of the invention will be described in detail hereinafter with reference to the drawings. Therein:

DETAILED DESCRIPTION

Figure 1:
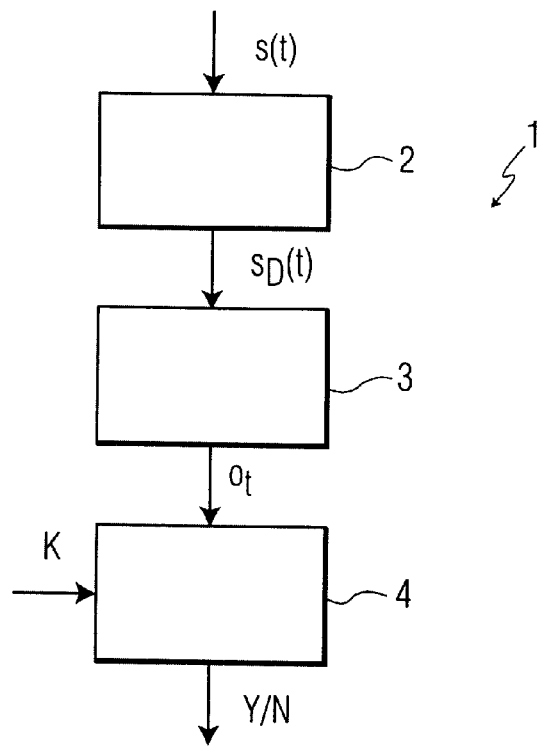
FIG. 1 shows a block diagram of the verification device according to the invention.

The device 1 for the verification of time-dependent, user-specific signals s(t) shown in FIG. 1 includes a function block 2 which converts the signals s(t) into a stream of digitized sampling values $s_D(t)$. The signals s(t) notably represent signatures, but may also be, for example speech signals. For signature verification the function block 2 can be realized, for example by means of the Philips product PAID (Philips Advanced Interactive Display) which is described in detail in U.S. Pat. No. 5,231,381. Therein, a signature can be entered by means of a special input stylus; the co-ordinates (x and y co-ordinates) passed on the input surface while writing the signature, the pressure applied to the input surface via the input stylus during writing, and the relevant inclination of the input stylus in space are then determined. The analog input values generated by means of the input stylus are converted into digitized sampling values $s_D(t)$ which are subjected to a preprocessing operation which is represented by the function block 3 and will be described in detail hereinafter with reference to the FIGS. 2 and 3 The preprocessing operation generates feature vectors $o_t$ whose components contain, for given sampling intervals or given sampling instants t, digitized values (features) derived from the digitized sampling values $s_D(t)$. The feature vectors $o_t$, are then further processed in conformity with the function block 4 whose output is a yes or no decision, Y or N, which is output notably as a binary value 1 or 0. This will be described in detail hereinafter with reference to FIG. 4. To this end it is necessary, and ensured, that in addition to the input of the user-specific signal s(t) there is entered a respective user identification K, for example by entering the relevant user name or a number assigned to the relevant user. A yes decision Y means that the input signal s(t) has been identified and verified as an original stemming from the user with the input user identification K. A no decision N means that the input signal s(t) is classified as a forgery.

Figure 2:
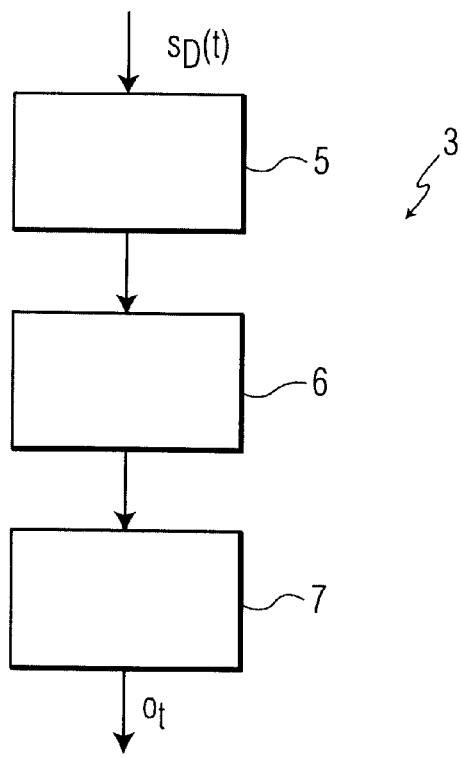
FIGS. 2 and 3 show flow charts for two possibilities for preprocessing.

FIG. 2 illustrates a feasible version of the preprocessing operation represented by the function block 3. The digitized sampling values $s_D(t)$ are applied to a smoothing filter 5. Subsequently, the sampling values $s_D(t)$ are gathered in frames in the function block 6, the frames corresponding either to time intervals of selectable length or distances in space of selectable length. Subsequently, for each frame there is formed a feature vector $o_t$ (function block 7). For example, from the various sampling values for each frame there is determined a co-ordinate pair which corresponds to a given position in space and has a given x value and a given y value, formed from the various sampled co-ordinate values by averaging. Analogously, for each frame there is also determined a value concerning the pressure exerted on the input surface and also a co-ordinate pair for the inclination in space of the input stylus. The number of features gathered in a feature vector can be further increased as desired. The frames may overlap or also succeed one another without overlap.

Figure 3:
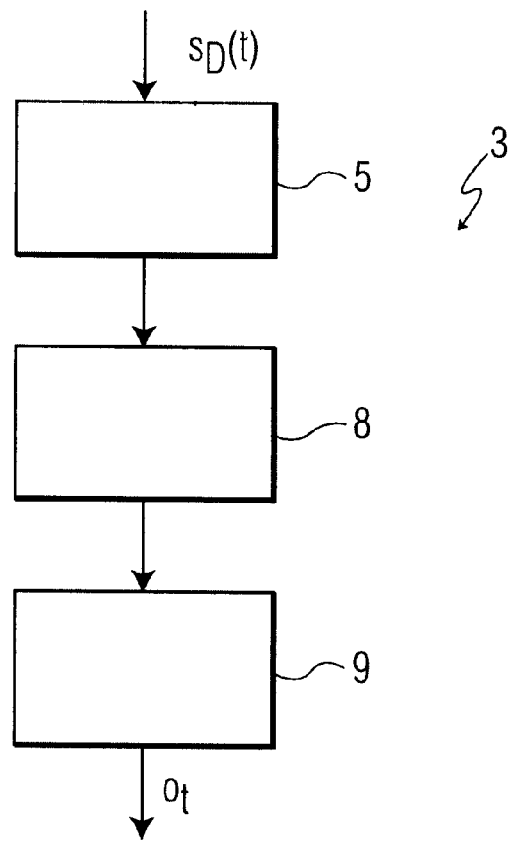

According to a further version of the preprocessing operation as shown in FIG. 3, the sampled signal with the sampling values $s_D(t)$ is not subdivided into frames of fixed length, but into segments of variable length (in conformity with the function block 8). The segment boundaries are defined notably by the points at which a change of sign occurs for the velocity $v_x$ in the direction of the x co-ordinate or of the velocity $v_y$ in the direction of the y co-ordinate. The velocities $v_x$ and $v_y$ are obtained by differentiation of the function of the detected x and y values. The segments thus formed may also overlap or succeed one another without overlap. Analogous to the processing using frames, a feature vector $o_t$ is formed for each segment (function block 9). The preprocessing operation involving segmentation is preferably used.

The preprocessing operation yields a set O of feature vectors $o_t=o_l...,o_T$ which serves to describe a user-specific signal s(t) applied to the device 1. Therein, T denotes the number of frames or segments, with each of which) there is associated a respective feature vector $o_t$. Selectable sampling intervals or sampling instants are assigned to each frame or segment.

Figure 4:
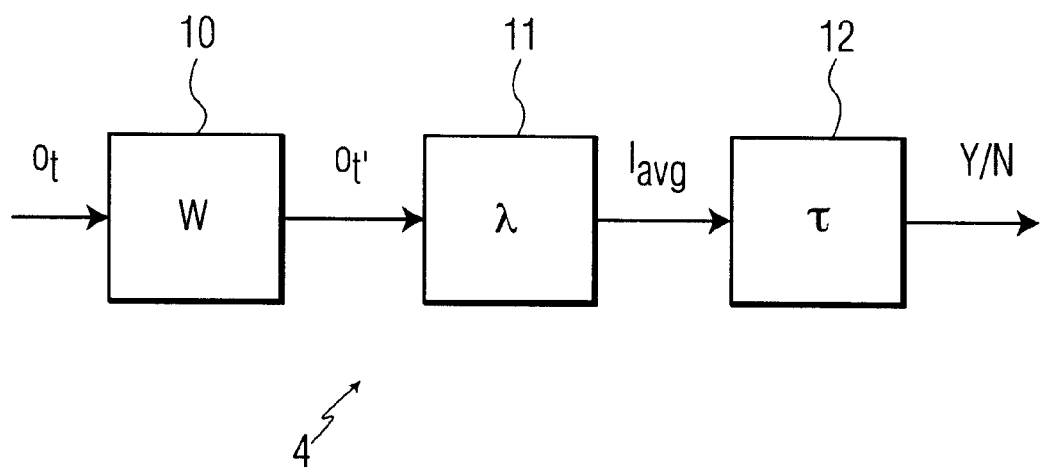
FIG. 4 shows a block diagram for the processing succeeding the preprocessing.

The processing of one of the feature vectors $o_t$ so as to produce the yes/no decision Y/N will be described in detail hereinafter with reference to FIG. 4. First of all, the feature vectors $o_t$ produced by the preprocessing operation are subjected to an LDA (Linear Discriminant Analysis) transformation. This transformation is described, for example in K. Fukunaga: "Introduction to Statistical Pattern Recognition". Second Edition, Academic Press, New York, 1990, chapters 10.1 and 10.2. The feature vectors $o_t$ of dimension L are then multiplied by a user-specific transformation matrix W of dimension L×D (function block 10), thus producing transformed feature vectors $o_t'$ of dimension D ($D \leq L$). The set O' of feature vectors $o_t'$ thus generated is further processed in conformity with a user-specific HMM model λ.(function block 11). The structure of HMM models is disclosed in the book by L. R. Rabiner and B. H. Juang: "Fundamentals of speech recognition", First Edition, Prentice Hall, 1993, chapters 6.4 to 6.6. The function block 11 yields a probability value $l_{avg}$ which is formed in conformity with the formule $$l_{avg}(O', \lambda) = -\frac{1}{T}\sum_{t=1}^{T} \log b_{o_t}(o_t')$$

where $l_{avg}(O',\lambda)$ is the probability value to be determined for a set O' of feature vectors $o_t'$, given the HMM model λ for the user-specific signal; t is a variable for characterizing the sampling interval for which a feature vector $o_t'$ is formed (t characterizes the frames or segments); T is the total number of feature vectors $o_t'$, $q_t$ is a variable for an observed state of the HMM model λ; $b_{q_t}(o_t')$ are emission probabilities densities or emission probabilities for the state $q_t$ of the HMM model λ for a given feature vector $o_t'$.

The probability value $l_{avg}$ is thus produced by forming an average value, in this case by forming an arithmetical mean value.

The probability value $l_{avg}$ is applied to a threshold decider which is represented by a function block 12 and compares the value $l_{avg}$ with a threshold value τ. This threshold value is formed in conformity with the formule $$\tau = l_{validate} + C$$

where $l_{validate}$ is an automatically determined, person-dependent probability value. In order to determine this threshold value for a given user, first the HMM model is trained with a given number of (for example, 10) original signals s(T) (the training signals) of this user. The HMM model, thus determined is used at a later stage for the operation of the verification device 1 in the function block 11. In conjunction with this training, the LDA transformation matrix W which is used during the operation of the device 1 is also determined as will be described hereinafter. Subsequently, the verification device 1 thus conditioned is successively supplied with one or more (for example, 5) additional original signals s(t) (the validation signals). The device 1 determines the probability value $l_{avg}$ for each validation signal s(t). Subsequently, the probability values $l_{avg}$ thus determined are averaged; in the present case this is realized by forming the arithmetical mean value. In order to determine the threshold value X in the present embodiment a constant C, which is to be empirically determined and is dependent on the actual frame conditions, is added thereto so that the error rate that can be achieved for the verification device 1 is regularly improved. The constant C is user-independent. The addition of a constant C, however, is not absolutely necessary. Moreover, the constant C can also be used to adjust the characteristic verification behavior of the verification device to user-specific requirements. The constant C can be used so as to find and adjust the so-called "equal error rate"(EE) and hence the threshold value at which the number of erroneous verfications and the number of erroneous classifications of user-specific signals as forgerics ate equal. C could also be adjusted so that the number of erroneous verifications equals zero and the number of erronous classifications as forgeries also equals zero. This adjustment is of interest notably for military applications when unauthorized access to given areas is to be precluded in all circumstances. The constant C could also be adjusted in such a manner that the number of erroneous classifications as forgeries equals zero and that the number of erroneous verifications assumes a given value. This makes sense, for example, whenever customers are not to be annoyed, for example in given fields of activity of banks.

Depending on whether the probability value $l_{avg}$ determined for a signal s(t) lies above or below the threshold value τ, during operation of the device 1, the comparison with the threshold value τ performed in the function block 12 offers the result that either a forgery or an original signal is concerned, corresponding to and decision and a yes decision, respectively. The output value supplied by the function block 12 can be additionally provided with information concerning the gap between the probability value $l_{avg}$ and the threshold value τ; such information can be used during further processing.

Via the LDA transformation, the feature vectors $o_t'$ formed for the signals s(t) are adapted to the HMM model λ used, resulting in an improved error rate during the verification of user-dependent signals s(t). The adaptation of the feature vectors $o_t'$ can be configured as follows; the feature vectors $o_t'$ are plotted in a multidimensional space with a multidimensional co-ordinate system whose dimension corresponds to the number of components of the feature vectors $o_t'$; the LDA transformation on the one hand provides a suitable rotation of the co-ordinate system and on the other hand a suitable compression or expansion of the co-ordinates of the co-ordinate system, so that the co-ordinate system is better adapted to the classes of the LDA transformation (corresponding to the states of the HMM model λ). The feature vectors $o_t'$ modified by means of the LDA transformation have components which are arranged in a maximum compact arrangement in conformity with their value for the characterization of the person-dependent signal s(t) processed here. This aspect can be used to select given features of the feature vectors $o_t'$ automatically in dependence on their relevance to the characterization of the signal s(t) and hence to the verification thereof; this is done notably by ignoring the rows of the LDA transformation matrix W which contain the smallest eigenvalues during the LDA transformation so that an LDA transformation matrix W of reduced dimension is used. This corresponds to an HMM model λ with a reduced number of parameters; this can ultimately be used to reduce the amount of calculation work during operation of the device 1 and to reduce the required storage space.

Figure 5:
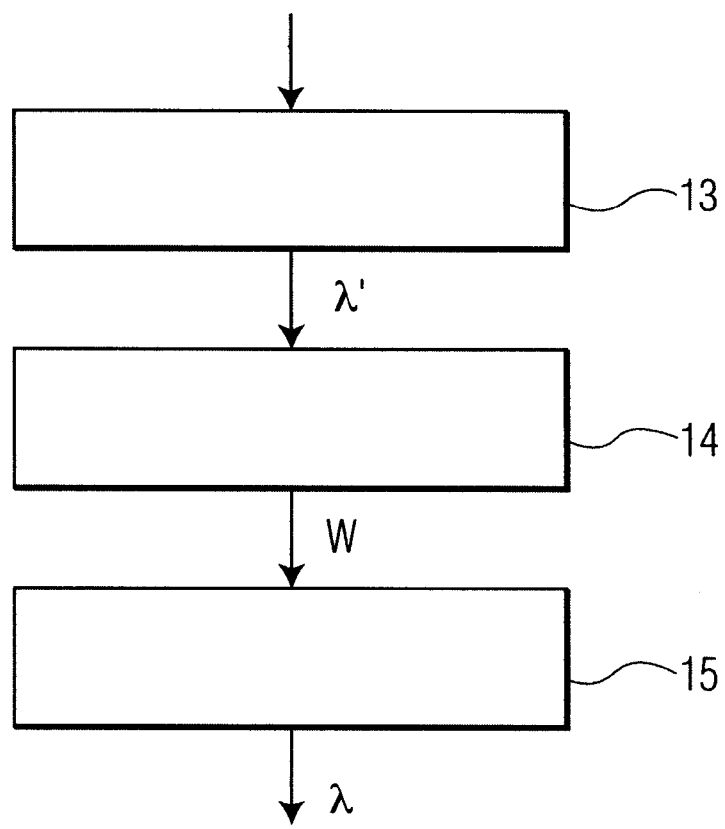
FIG. 5 shows a block diagram for the training of the HMM model used.

The training of the HMM model λ in the present case will now be described with reference to FIG. 5. This model is person-specific, i.e. such an HMM model λ is formed for each user with a user identification K and is stored in the device 1. The training of the HMM model λ is performed by means of a given number of training signals, being original signals of the relevant user. For example, 10 original signals are used. Function block 13 represents the first training run for the HMM model λ, yielding a provisional HMM model λ'. During this training run the feature vectors $o_t'$, corresponding to the training signals, are used directly for modeling, i.e. the feature vectors $o_t$ are not subjected to an LDA transformation. The training of the HMM model is performed on the basis of the so-called maximum likelihood criterion which is executed approximately by a Viterbi approximation. In this respect reference is made to the cited Rabiner and B. H. Juang "Fundamentals of speech recognition". After the formation of a provisional HMM model λ', the LDA transformation matrix W is calculated therefrom (function block 14). An cigenvalue problem must be solved a in order to determine the matrix W. The classes of the LDA transformation are defined as states of the provisional HMM model λ'. For details concerning the determination of the matrix W reference is made to the cited K. Fukunaga "Introduction to Statistical Pattern Recognition". Subsequently, using the training signals of the user a new training run is performed (function block 15), which training run is based on transformed feature vectors $o_t' = W o_t$ instead of the feature vectors $o_t$.

Figure 6:
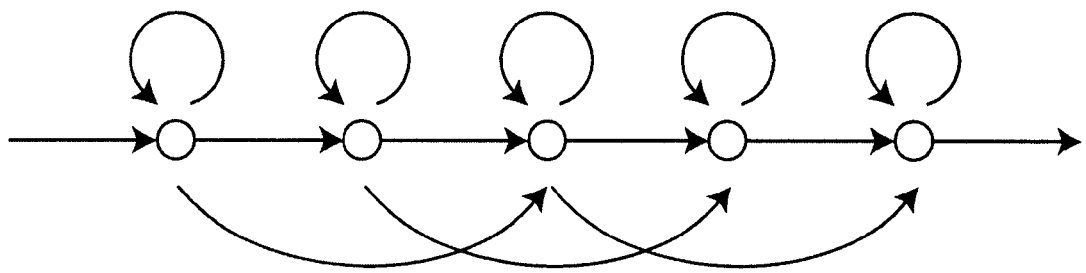
FIG. 6 illustrates the principle of the HMM model used.

FIG. 6 shows the basic structure of the HMM model which is converted in the function block 11. Use was made of a so-called "left-to-right" model (Bakis model). The states are denoted by circles end state transitions by arrows. For more details in this respect reference is made to L. Yang, B. Widjaja and R. Prasad "Application of hidden Markov models for signature verification", Pattern Recognition 28, pp. 161–170.

The described function blocks are implemented, for example by means of software on a PC whereto a suitable input unit for the input and digitization of user-specific signals is connected (for example, the above-mentioned Philips apparatus PAID in the case of signatures). The invention is notably also suitable for on-line verification. The conversion of a signature procedure can also be performed by moans of input styli whereby a signature is issued on paper.

What is claimed is:

1. A device for the verification of time-dependent, user-specific signals which includes
    means for generating a set (O') of feature vectors ($o_t'$) which serve to provide an approximative description of an input signal and are associated with selectable sampling intervals of the signal;
    means for preparing an HMM model (λ) for the signal;
    means for determining a first probability value which describes the probability of occurrence of the set (O') of feature vectors ($o_t'$), given the HMM model (λ), and
    a threshold decider for comparing the first probability value with a threshold value (τ) and for deciding on the verification of the signal; characterized in that the threshold value (τ) is dependent on an automatically determined, person-dependent second probability value ($l_{validate}$) which is formed by means of training signals used for training the HMM model (λ) and at least one additional validation signal which is not used for the training.

2. A device as claimed in claim 1, characterized in that the second probability value ($l_{validate}$) is formed by forming an average value, notably the arithmetical mean value, of the first probability values ($l_{avg}$) which are formed upon input of the validation signals after the training of the HMM model (λ).

3. A device as claimed in claim 1, characterized in that the threshold value (τ) is the sum of the second probability value ($l_{validate}$) and a user-independent constant(C).

4. A device as claimed in claim 1, characterized in that on-line verification is performed.

5. A device as claimed in claim 1, characterized in that the user-specific signals are signatures.

6. A device as claimed in claim 1, characterized in that the user-specific signals are speech signals.

7. A method of verifying, time-dependent, user-specific signals in which:
    a set (O') of feature vectors ($o_t'$) is generated, which vectors serve to provide an approximative description of an input signal and are associated with selectable sampling intervals of the signal,
    an HMM model (λ) is prepared for the signal;
    a first probability value is determined which describes the probability of occurrence of the set (O') of feature vectors ($o_t'$), given the HMM model (λ);
    a threshold decider compares the first probability value with a threshold value (τ) and decides on the verification of the signal;
    the threshold value (τ) is dependent on an automatically determined, person-dependent second probability value ($l_{validate}$) which is formed by means of training signals used for training The HMM mode (λ) and at least one additional validation signal which is not used for the training.

* * * * *